US007493281B2

(12) United States Patent
Vogel et al.

(10) Patent No.: US 7,493,281 B2
(45) Date of Patent: *Feb. 17, 2009

(54) AUTOMATIC NOTIFICATION OF IRREGULAR ACTIVITY

(75) Inventors: Inna Vogel, San Jose, CA (US); Mei Ye, San Jose, CA (US)

(73) Assignee: eBay Inc., San Jose, CA (US)

( * ) Notice: Subject to any disclaimer, the term of this patent is extended or adjusted under 35 U.S.C. 154(b) by 674 days.

This patent is subject to a terminal disclaimer.

(21) Appl. No.: 11/158,651

(22) Filed: Jun. 22, 2005

(65) Prior Publication Data
US 2005/0240481 A1    Oct. 27, 2005

Related U.S. Application Data

(63) Continuation of application No. 09/661,168, filed on Sep. 13, 2000, now Pat. No. 6,944,599.

(51) Int. Cl.
G06Q 40/00    (2006.01)
(52) U.S. Cl. ............................ 705/37; 705/35; 705/22
(58) Field of Classification Search ................. 705/26, 705/1, 37, 35, 22
See application file for complete search history.

(56) References Cited

U.S. PATENT DOCUMENTS

| 3,573,747 | A | 4/1971 | Adams et al. |
| 3,581,072 | A | 5/1971 | Nymeyer |
| 4,412,287 | A | 10/1983 | Braddock, III |
| 4,674,044 | A | 6/1987 | Kalmus et al. |
| 4,677,552 | A | 6/1987 | Sibley, Jr. |
| 4,789,928 | A | 12/1988 | Fujisaki |
| 4,799,156 | A | 1/1989 | Shavit et al. |

(Continued)

FOREIGN PATENT DOCUMENTS

CA    2253543    3/1997

(Continued)

OTHER PUBLICATIONS

"Personal Optimized Decision/Transaction Program", *IBM Technical Disclosure Bulletin*, 38(1), (Jan. 1995),83-84.

(Continued)

*Primary Examiner*—Jagdish N Patel
(74) *Attorney, Agent, or Firm*—Schwegman, Lundberg & Woessner, P.A.

(57) ABSTRACT

A computer-implemented method includes receiving item data at a network-based transaction facility, the item data related to an item categorized in at least a first category of a plurality of categories of the network-based transaction facility and including an item price-based value associated with the item. A category-specific threshold price-based value, for the first category of the plurality of categories of the network-based transaction facility, is automatically determined. The item data is automatically determined to the irregular, based on the item price-based value associated with the item and the category-specific threshold price-based value for the first category of the plurality of categories of the network-based transaction facility. Responsive to the determination that the item data is irregular, an electronic message is automatically communicated to an entity associated with the item.

16 Claims, 9 Drawing Sheets

U.S. PATENT DOCUMENTS

| | | |
|---|---|---|
| 4,823,265 A | 4/1989 | Nelson |
| 4,864,516 A | 9/1989 | Gaither et al. |
| 4,903,201 A | 2/1990 | Wagner |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,235,702 A | 8/1993 | Miller |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,305,200 A | 4/1994 | Hartheimer et al. |
| 5,325,297 A | 6/1994 | Bird et al. |
| 5,329,589 A | 7/1994 | Fraser et al. |
| 5,375,055 A | 12/1994 | Togher et al. |
| 5,394,324 A | 2/1995 | Clearwater |
| 5,426,281 A | 6/1995 | Abecassis |
| 5,485,510 A | 1/1996 | Colbert |
| 5,553,145 A | 9/1996 | Micali |
| 5,557,728 A | 9/1996 | Garrett et al. |
| 5,596,994 A | 1/1997 | Bro |
| 5,598,557 A | 1/1997 | Doner et al. |
| 5,640,569 A | 6/1997 | Miller et al. |
| 5,657,389 A | 8/1997 | Houvener |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,722,418 A | 3/1998 | Bro |
| 5,727,165 A | 3/1998 | Ordish et al. |
| 5,771,291 A | 6/1998 | Newton et al. |
| 5,771,380 A | 6/1998 | Tanaka et al. |
| 5,790,790 A | 8/1998 | Smith et al. |
| 5,794,219 A | 8/1998 | Brown |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,872,848 A | 2/1999 | Romney et al. |
| 5,873,069 A | 2/1999 | Reuhl et al. |
| 5,874,412 A | 2/1999 | Priebe et al. |
| 5,884,056 A | 3/1999 | Steele |
| 5,890,138 A | 3/1999 | Godin et al. |
| 5,895,453 A | 4/1999 | Cook |
| 5,905,974 A | 5/1999 | Fraser et al. |
| 5,905,975 A | 5/1999 | Ausubel |
| 5,922,074 A | 7/1999 | Richard et al. |
| 5,924,072 A | 7/1999 | Havens |
| 5,926,794 A | 7/1999 | Fethe |
| 5,991,739 A | 11/1999 | Cupps et al. |
| 6,032,132 A | 2/2000 | Nelson |
| 6,035,402 A | 3/2000 | Vaeth et al. |
| 6,044,363 A | 3/2000 | Mori et al. |
| 6,047,264 A | 4/2000 | Fisher et al. |
| 6,055,518 A | 4/2000 | Franklin et al. |
| 6,058,417 A | 5/2000 | Hess et al. |
| 6,061,448 A | 5/2000 | Smith et al. |
| 6,073,117 A | 6/2000 | Oyanagi et al. |
| 6,085,176 A | 7/2000 | Woolston |
| 6,104,815 A | 8/2000 | Alcorn et al. |
| 6,119,137 A | 9/2000 | Smith et al. |
| 6,122,624 A * | 9/2000 | Tetro et al. ............... 705/44 |
| 6,178,408 B1 | 1/2001 | Copple et al. |
| 6,192,407 B1 | 2/2001 | Smith et al. |
| 6,202,051 B1 | 3/2001 | Woolston |
| 6,243,691 B1 | 6/2001 | Fisher et al. |
| 6,360,211 B1 | 3/2002 | Anderson et al. |
| 6,449,601 B1 | 9/2002 | Friedland et al. |
| 6,477,647 B1 | 11/2002 | Venkatraman et al. |
| 6,944,599 B1 | 9/2005 | Vogel et al. |
| 7,096,192 B1 * | 8/2006 | Pettitt ........................ 705/26 |
| 7,162,494 B2 | 1/2007 | Arellano |
| 7,165,051 B2 * | 1/2007 | Ronning et al. ............... 705/64 |
| 2002/0013760 A1 | 1/2002 | Arora et al. |
| 2002/0059130 A1 | 5/2002 | Cheng et al. |
| 2002/0161641 A1 | 10/2002 | Quinlan et al. |
| 2004/0098333 A1 | 5/2004 | Meesseman |
| 2005/0144052 A1 | 6/2005 | Harding et al. |
| 2005/0228722 A1 | 10/2005 | Embree |

FOREIGN PATENT DOCUMENTS

| | | |
|---|---|---|
| FR | 2658635 | 2/1991 |
| NL | 9300266 | 2/1993 |
| WO | WO-9215174 | 9/1992 |
| WO | WO-9517711 | 6/1995 |
| WO | WO-9634356 | 10/1996 |
| WO | WO-9737315 A1 | 10/1997 |
| WO | WO-9963461 | 12/1999 |

OTHER PUBLICATIONS

Business Editors/Computer Writer, "Onsale: Onsale Brings Thrill of Auctions and Bargain Hunting Online; Unique Internet retail service debuts with week-long charity auction for The Computer Museum in Boston", *Business Wire*, (May 24, 1995),3 pages.

Clemons, E , "Evaluating the prospects for alternative electronic securities", *Proceedings of ICIS 91: 12th International Conference on Information Systems*, (Dec. 16-18, 1991),53-61.

Computer Reseller News, "Onsale Joins Fray as Online Shopping Picks Up Speed: Internet Booms", *Computer Reseller News*, (Jun. 5, 1995),73.

Graham, I , "The Emergence of Linked Fish Markets in Europe", *EM—Electronic Commerce in Europe. EM—Electronic Markets*, 8(2), (Jul. 1998),29-32.

Hauser, R , "Anonymous Delivery of Goods in Electronic Commerce", *IBM Technical Disclosure Bulletin*, 39(3), (Mar. 1996),363-366.

Hess, C M., "Computerized Loan Organization System: An Industry Case Study of the Electronic Markets Hypothesis", *MIS Quarterly*, 18(3), (Sep. 1994),251-274.

Klein, Stefan , "Introduction to Electronic Auctions", *EM—Electronic Auctions. EM—Electronic Markets*, vol. 7, No. 4, (Dec. 1997),3-6.

Lee, H G., "AUCNET: Electronic Intermediary for Used-Car Transactions", *EM—Electronic Auctions. EM—Electronic Markets*,7(4), (Dec. 1997),24-28.

Lee, H. G., "Electronic brokerage and electronic auction: the impact of IT on market structures", *Proceedings of the Twenty-Ninth Hawaii International Conference on System Sciences*, vol. 4, (Jan. 3-6, 1996),397-406.

Malone, T W., "Electronic Markets and Electronic Hierarchies", *Communications of the ACM*, 30(6), (Jun. 1987),484-497.

Mardesich, Jodi , "Site Offers Clearance for End-of-Life Products—Onsale Takes Auction Gavel Electronic", *Computer Reseller News*, (Jul. 8, 1996),2 pages.

Massimb, Marcel , "Electronic Trading, Market Structure and Liquidity", *Financial Analysts Journal*, 50(1), (Jan./Feb. 1994),39-50.

Meade, Jim, "Visual 360: A Performance Appraisal System That's 'Fun'", *HR Magazine*, (Jul. 1999),1-3.

Neo, Boon S., "The implementation of an electronic market for pig trading in Singapore", *Journal of Strategic Information Systems*, 1(5), (Dec. 1992),278-288.

Post. D L., "Application of auctions as a pricing mechanism for the interchange of electric power", *IEEE Transactions on Power Systems*, 10(3), (Aug. 1995),1580-1584.

Preist, Chris, "Adaptive Agents in a Persistent Shout Double Auction", *International Conference on Information and Computation Economies, Proceedings of the first international conference on Information and computation economies*, (1998),25-281.

Reck, Martin, "Formally specifying an automated trade execution system", *Journal of Systems and Software*, 21(3), (Jun. 1993),245-252.

Reck, Martin, "Trading-Process Characteristics of Electronic Auctions", *EM—Electronic Auctions. EM—Electronic Markets*, 7(4), Focus Theme,(Dec. 1997),17-23.

Resnick, Paul, "Reputation systems", *Communications of the ACM*, 43(12), (Dec. 2000),45-48.

Rockoff, Todd, "Design of an Internet-based system for remote Dutch auctions", *Internet Research: Electronic Networking Applications and Policy*, 5(4), (1996),10-16.

Schmid, B F., "Electronic Markets—The Development of Electronic Commerce, Electronic Markets", *Newsletter of the Competence Centre, EM—The Development of Electronic Commerce, Electronic Markets*, 9/10, No. 9/10,(Oct. 1993),3-4.

Siegmann, Ken, "Nowhere to Go but Up", *PC Week*, 12(42), (Oct. 23, 1995),A5(1), 1-3.

Tjostheim, Ingvar, "A case study of an on-line auction for the World Wide Web", *Norwegian Computing Center (NR)*, (1997),1-10.

Turban, E, "Auctions and Bidding on the Internet: An Assessment", *EM—Electronic Auctions. EM—Electronic Markets*, 7(4), (Dec. 1997),7-11.

Van Heck, E., et al., "Experiences Electronic Auctions in the Dutch Flower Industry", *EM—Electronic Auctions. EM—Electronic Markets*, 7(4), (1997),29-34.

Warbelow, A, "Aucnet: TV Auction Network System", *Harvard Business School Case/Study*, HBVR#9-190-001, (Jul. 1989),1-16.

Zwass, Vladimir, "Electronic Commerce: Structures and Issues", *International Journal of Electronic Commerce*, 1(1), (Fall 1996),3-23.

www.amazon.com, (Oct. 18, 2000), 2 pgs.

U.S. Appl. No. 10/822,894, Non-Final Office Action Mailed Jun. 27, 2008, 11 pgs.

\* cited by examiner

| Data | | | | | |
|---|---|---|---|---|---|
| Item ID | Selling Price | Price-Based Fee | Irregular Flag | Seller Id | Bidder Id |
| Item 1 | $2500 | $44.37 | 0 | A | E |
| Item 2 | $150,000 | $1888.12 | 0 | B | F |
| Item 3 | $1800 | $35.62 | 0 | C | G |
| Item 4 | $1950 | $37.50 | 0 | D | H |

FIGURE 3a

| Data | | | | | |
|---|---|---|---|---|---|
| Item ID | Selling Price | Price-Based Fee | Irregular Flag | Seller Id | Bidder Id |
| Item 1 | $2500 | $44.37 | 0 | A | E |
| Item 2 | $150,000 | $1888.12 | 1 | B | F |
| Item 3 | $1800 | $35.62 | 0 | C | G |
| Item 4 | $1950 | $37.50 | 0 | D | H |

FIGURE 3b

AUTOMATIC NOTIFICATION OF IRREGULAR ACTIVITY

RELATED APPLICATION

The present application is a Continuation of U.S. patent application Ser. No. 09/661,168, filed Sep. 13, 2000 now U.S. Pat. No. 6,944,599, which application is incorporated herein by reference.

TECHNICAL FIELD

The present application relates generally to the monitoring irregular activity in a computer-system.

BACKGROUND

Network-based transaction facilities (e.g., business-to-business, business-to-consumer and consumer-to-consumer Internet marketplaces and retailers) provide convenience of access to users of such facilities and on-line communities. Information regarding sales made through network-based transaction facilities may be automatically extracted and reported for any desired time interval—hourly, daily, weekly, monthly, etc. This information is useful to the facilities for a variety of reasons including record keeping, generating statistics, calculating revenue, etc.

For example, an Internet-based retailer may generate a report listing the items sold during the day and the revenue generated by the sales. An Internet-based bookstore may, for example, generate reports listing the number of books sold during the past month in a specific category or by a specific author. Such statistics are useful in assisting a purchaser with a buying decision or assisting the retailer with stocking decisions.

For a network-based transaction facility, such as an Internet-based auction facility, and its users, information regarding sales is particularly important for setting fees and providing price guidance to users. Fees may be set based on volume or price of the items sold for individual users. The network-based auction facility may use sales information and statistics to determine how to set fees. The network-based auction facility may further use information generated on a periodic basis to guide sellers in setting prices at which to sell their items or buyers in bidding for items by indicating the average price or price range of the type of product being sold. Thus, there is a need for accurate reporting of information.

SUMMARY

According to a first aspect, a computer-implemented method includes receiving item data at a network-based transaction facility, the item data related to an item categorized in at least a first category of a plurality of categories of the network-based transaction facility and including an item price-based value associated with the item. A category-specific threshold price-based value, for the first category of the plurality of categories of the network-based transaction facility, is automatically determined. The item data is automatically determined to the irregular, based on the item price-based value associated with the item and the category-specific threshold price-based value for the first category of the plurality of categories of the network-based transaction facility. Responsive to the determination that the item data is irregular, an electronic message is automatically communicated to an entity associated with the item.

BRIEF DESCRIPTION OF THE DRAWINGS

The present invention is illustrated by way of example and not limitation in the figures of the accompanying drawings, in which like references indicate similar elements and in which:

FIGS. 3a and 3b are diagrammatic representations of an exemplary embodiment of a transaction record table;

DETAILED DESCRIPTION

A method and system for monitoring and automatically reporting irregular activity on a network-based transaction facility are described. In the following description, for purposes of explanation, numerous specific details are set forth in order to provide a thorough understanding of the present invention. It will be evident, however, to one skilled in the art that the present invention may be practiced without these specific details.

Terminology

For the purposes of the present specification, the term "transaction" shall be taken to include any communications between two or more entities and shall be construed to include, but not be limited to, commercial transactions including sale and purchase transactions, auctions and the like. The term "suspect" shall be taken to indicate requiring further investigation or scrutiny. The term "irregular" shall be taken to indicate a derivation from a norm or an exceeding of boundaries or a range.

Transaction Facility

Figure 1:
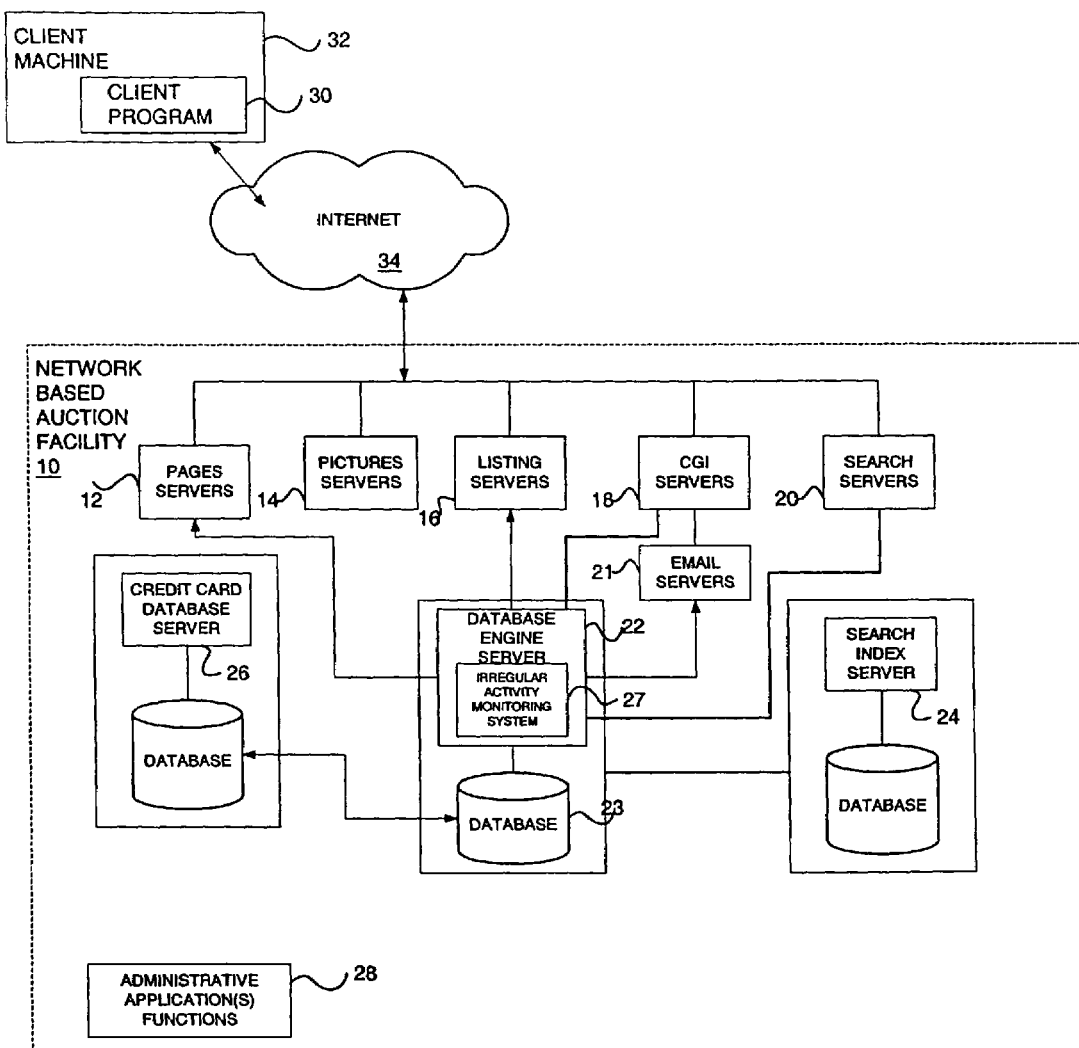
FIG. 1 is a block diagram illustrating an exemplary network-based transaction facility in the form of an Internet-based auction facility.

FIG. 1 is a block diagram illustrating an exemplary network-based transaction facility in the form of an Internet-based auction facility 10. While an exemplary embodiment of the present invention is described within the context of an auction facility, it will be appreciated by those skilled in the art that the invention will find application in many different types of computer-based, and network-based, commerce facilities.

The auction facility 10 includes one or more of a number of types of front-end servers, namely page servers 12 that deliver web pages (e.g., markup language documents), picture servers 14 that dynamically deliver images to be displayed within Web pages, listing servers 16, CGI servers 18 that provide an intelligent interface to the back-end of facility 10, and search servers 20 that handle search requests to the facility 10. E-mail servers 21 provide, inter alia, automated e-mail communications to users of the facility 10.

The back-end servers include a database engine server 22 including an irregular activity monitoring system 27, a search index server 24 and a credit card database server 26, each of which maintains and facilitates access to a respective database.

The Internet-based auction facility 10 may be accessed by a client program 30, such as a browser (e.g., the Internet Explorer distributed by Microsoft Corp. of Redmond, Wash.) that executes on a client machine 32 and accesses the facility 10 via a network such as, for example, the Internet 34. Other examples of networks that a client may utilize to access the auction facility 10 include a wide area network (WAN), a local area network (LAN), a wireless network (e.g., a cellular network), or the Plain Old Telephone Service (POTS) network.

Database Structure

Figure 2:
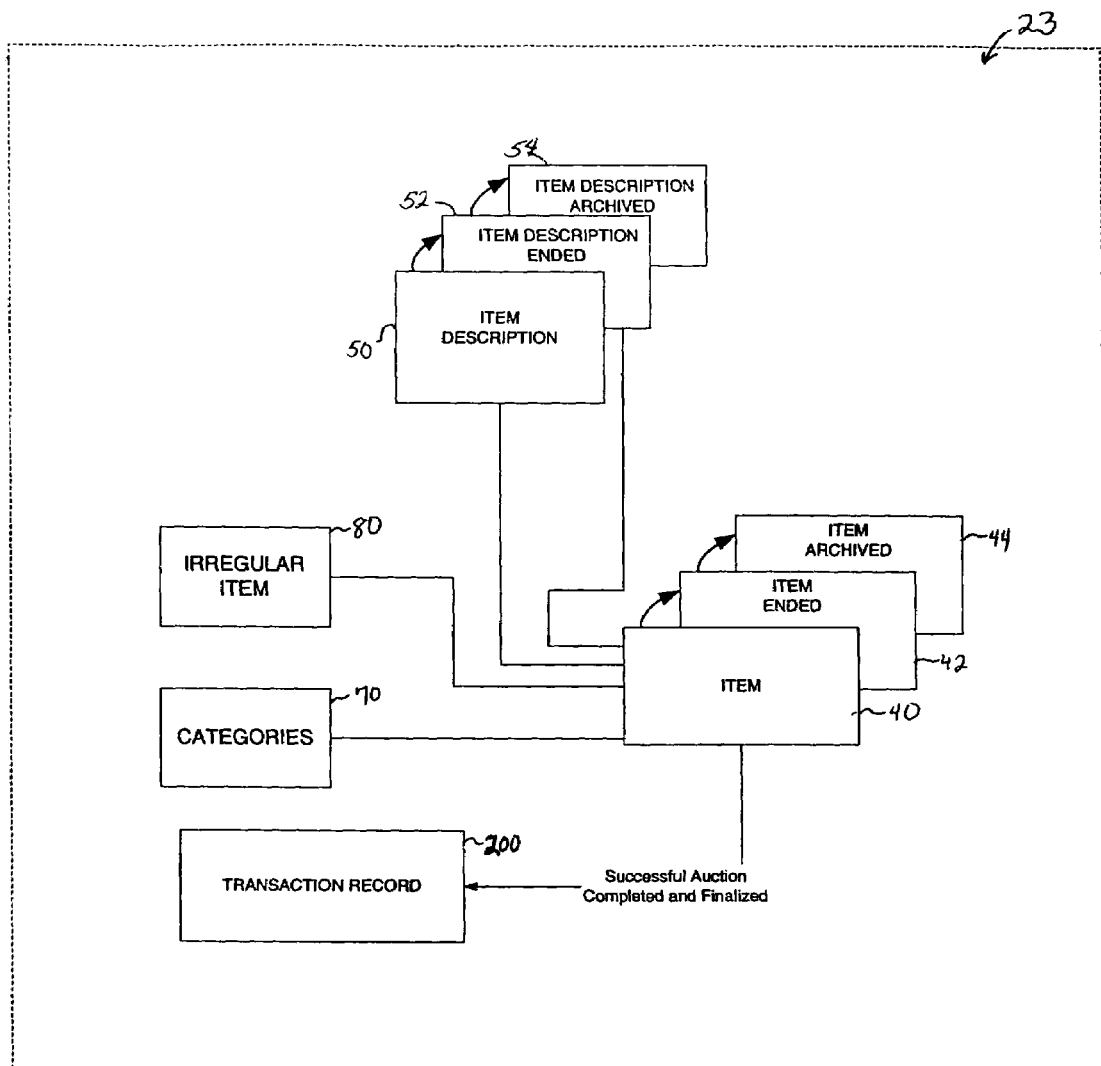
FIG. 2 is a block diagram illustrating an exemplary database that at least partially implements and supports the Internet-based auction facility of FIG. 1.

FIG. 2 is a database diagram illustrating an exemplary database 23, maintained by and accessed via the database engine server 22, which at least partially implements and supports the auction facility 10. Database engine server 22 includes an irregular activity monitoring system 27 which performs algorithms to remove irregular and suspect data items from data representations, as described below with reference to FIGS. 4-8.

The database 23 may, in one embodiment, be implemented as a relational database, and includes a number of tables having entries, or records, that are linked by indices and keys. In an alternative embodiment, the database 23 may be implemented as collection of objects in an object-oriented database.

Database 23 includes an item table 40, which contains a record for each item being auctioned on the auction facility 10. An item record in item table 40 may include, inter alia, an identification number, a marketplace indicator, sale type, title, location, seller, owner, category, quantity, bid count, sale start date, sale end date, highest bidder identification, billing currency, etc. The database 23 also includes an item ended table 42, linked to the item table 40, and an item archived table 44, linked to the item ended table 42. Each item from item table 40 is moved to the item ended table 42 two to three days after the end of the auction for that item. Each item from item ended table 42 is moved to item archived table 44 three months after the end of the auction for that item.

The item table 40 is also linked to item description table 50 and item description ended 52. Item description table 50, item description ended table 52 and item description archived table 54 may each include, inter alia, a description of each item in the item table, an identification for the item and a marketplace indicator for the item. Each item description from item description table 50 is moved to the item description ended table 52 two to three days after the end of the auction for that item. Each item description from item description ended table 52 is moved to item description archived table 54 three months after the end of the auction for that item.

A number of other tables are also shown to be linked to the item table 40, namely a transaction record table 200, a categories table 70 and an irregular item table 80. The irregular item table 80 may also be linked (not shown) to the transaction record table 200. Item information from item records in item table 40 is entered into transaction record table 200 upon the completion of a successful auction.

FIGS. 3a and 3b are diagrammatic representations of an exemplary embodiment of the transaction record table 300 that is populated with records, or entries, for completed, or ended, transactions (e.g., auctions) that have been facilitated by the auction facility 10. The table 300 includes an item identifier column 310 for each entry, and at least one price-based value column 320, 330 indicating, for example, the highest bid for the entry (or selling price) 320 or a fee, based on the highest bid 330, charged the seller by the network-based auction site 10. The item identifier entry may be an item number including a pointer to further item information in item table 40. The item information in item table 40 may include a pointer to category information in categories table 70.

An irregular flag column 340 stores a value 301-304 indicating whether the entry is irregular. A seller id column 350 and a bidder id column 360 store a user identifier for each of the seller of an item and the highest bidder (or purchaser) for the item, the user identifier comprising a pointer to further user information stored in a user table (not shown).

It should be noted that only one of the selling price column 320 or price-based fee column 330 is necessary for the operation of the present invention. Further, the irregular flag column 340, seller id column 350 and bidder id column 360 are also not required for the operation of the irregular activity monitoring and automatic reporting system. In the embodiment shown in FIGS. 3a and 3b, monitoring of the irregular activity is done using the transaction record table 300. In other embodiments, the irregular activity may be monitored and reported in any table that used by the auction site for reporting or representing data.

In FIGS. 3a and 3b, items 1-4 in column 310 are linked to the same category. The selling prices of items 1-4 are $2500, $150,000, $1800 and $1950, respectively. If the category is computers, for example, the category may be assigned an irregular activity threshold of $15,000 or another amount that would indicate that the item or the bid is irregular (or outside the normal range). In FIG. 3a, all of the irregular flag values 301-304 in column 340 are initially assigned a value of 0 when the item information is first entered in the transaction record table 300.

In FIG. 3b, item 2's irregular flag 302 has been changed from 0 to 1 to indicate that item 2 has some irregular activity associated with it. It should be noted that, in one embodiment, an entry is only created in the transaction record table 300 for transactions that have been established, for example, by the conclusion of an auction process, or by some other offer and acceptance mechanism between the purchaser and the seller. Thus, the irregular activity monitoring and automatic notification system, which may include changing the irregular flag value, may be triggered after information has been entered into a transaction record table 300, for example, for each category for all auctions in that category ending at a specific time.

The irregular flag may be implemented so that the irregular flag may be later changed back to 0, after further investigation. In another embodiment, the irregular flag may be implemented so that it may not be changed back to 0 once it has been changed to 1.

When irregular activity has been found, an email may be sent to the seller and/or bidder at an address associated with the user identifier of the seller and/or bidder. The seller and/or bidder may further be banned from participation on the auction site by using the pointer linking to the user table to update a "irregular_user" or similar field in the user record of the seller and/or bidder.

The irregular flag 301-304 in FIGS. 3a and 3b may be updated based on another price-based value, such as a price-based fee 330, for example. An auction site 10 may charge sellers fees based on the selling price of an item. Thus, the auction site may use the formula for determining fees to determine a threshold fee for monitoring irregular activity. In FIGS. 3a and 3b, the threshold fee for the category computers, for example, may be $200, based on a threshold price of $15,000. In another embodiment, the threshold fee may be simply the average fee plus a set amount, such as $300, for example. Thus, if the average fee for computers is $40, for example, then the threshold fee may be $340. Many other algorithms may be used to determine a threshold price-based value, such as a threshold price or threshold price-based fee.

The threshold price-based value may also be determined based on the currency of the transaction, the category of the transaction, or the geographic location of the transaction. For example, a table may be used to determine threshold prices for items where the rows of the table represent the categories of the item and the columns represent the currency of the transaction. The threshold values may be listed in U.S. dollars for uniformity. Although the transaction is completed in Japanese yen, the threshold value will be listed in dollars and the highest bid will be converted from yen to dollars to compare whether the threshold value has been exceeded. Thus, a transaction completed in Japanese yen won't be limited to the threshold set for transactions in U.S. dollars and transactions in U.S. dollars won't be limited to thresholds set for Japanese yen.

Figure 4:
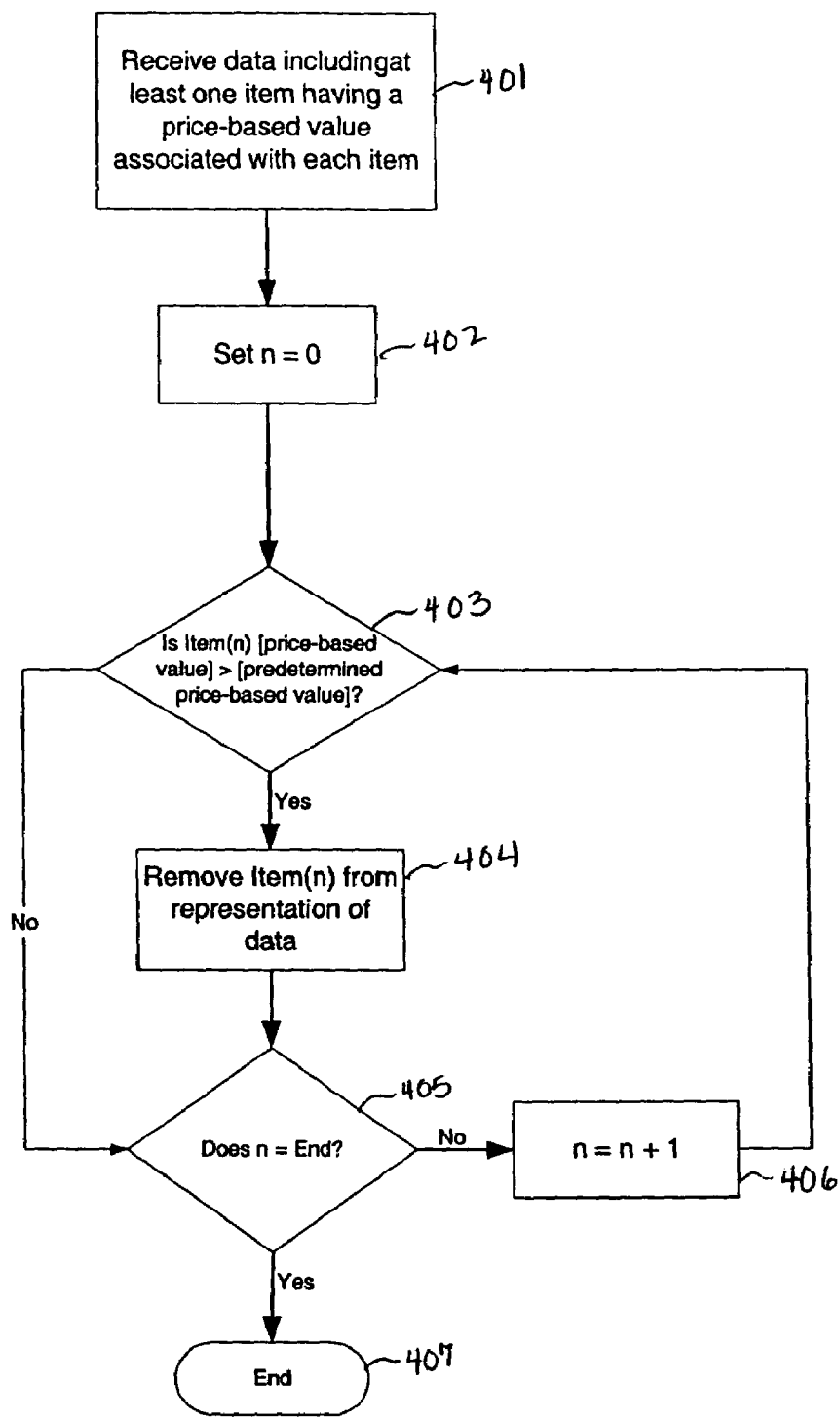
FIG. 4 is a flow diagram of one embodiment of an irregular activity monitoring and automatic notification system.

FIG. 4 is a flow diagram of one embodiment of an irregular activity monitoring and automatic notification system. At processing block 401, data is received, for example in the transaction record table 300, having at least one price-based value. Although the process is described with respect to transaction record table 300, it will be appreciated that the following processes may performed with any set of data at any location at auction site 10.

At processing block 402, a counter n is set to 0. At processing block 403, the irregular activity monitoring system 27 checks to see if a price-based value of Item (n) of a set of items has a value greater than a predetermined value. As discussed above, the set of items may be items from the same category which had transactions established, by the ending of an auction, for example, at the same time. The predetermined value would depend on which price-based value is being examined, the currency, the geographic area, the category of the item or any other parameter that may indicate different threshold values to establish irregular activity.

If the price-based value of item(n) is not greater than the predetermined value, the irregular activity monitoring system 27 skips to processing block 405, as described below.

If the price-based value of item(n) has a value greater than the predetermined value, at processing block 404, the item(n) is removed from further representations of the data, which may include, for example, reports or statistics based on established transactions. The irregular activity monitoring system 27 then proceeds to processing block 405 which checks whether the end of the set of items has been reached by comparing n to End. If n equals End, the system concludes checking for irregular activity at processing block 407.

If n does not equal End, the counter is incremented by 1 and the irregular activity monitoring system 27 returns to processing block 403 to check then next item in the set of items.

It will be appreciated that the irregular activity monitoring system 27 may be implemented as part of a larger application or may be implemented by itself.

Figure 5:
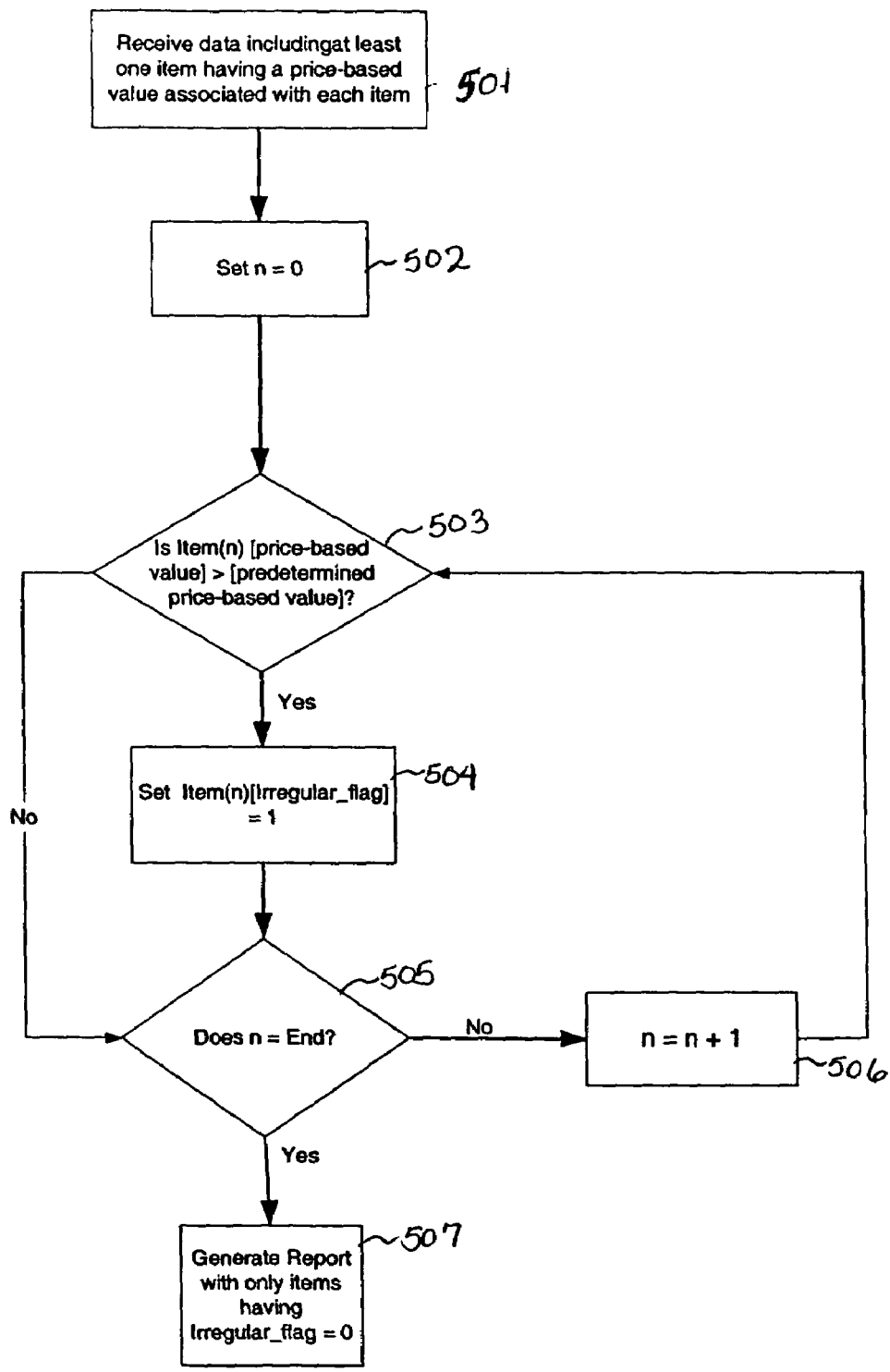
FIG. 5 is a flow diagram of a second embodiment of an irregular activity monitoring and automatic notification system.

FIG. 5 is a flow diagram of a second embodiment of an irregular activity monitoring and automatic notification system. At processing block 501, data is received including at least one item record having at least one price-based value associated with the item, as discussed above with respect to FIG. 4. At processing block 502, a counter n is set to 0.

At processing block 503, the price-based value of item(n) of a set of items is compared to a predetermined price-based value. If the price-based value of item(n) is not greater than the predetermined value, the irregular activity monitoring system 27 goes on to processing block 505.

If the price-base value of item(n) is greater than the predetermined value, at processing block 504, the value of an irregular_flag associated with item(n) is changed from 0 to 1. The system then proceeds to processing block 505 where the system checks to see if the end of the set of items has been reached. If the end of the set has not been reached, at processing block 506, the counter n is incremented by 1 and the system proceeds to processing block 503 to check the price-based value of the next item. If the end of the set has been reached, the system proceeds to processing block 507 where a report or other data representation is generated where the data representation only includes items having an irregular flag value of 0.

Figure 6:
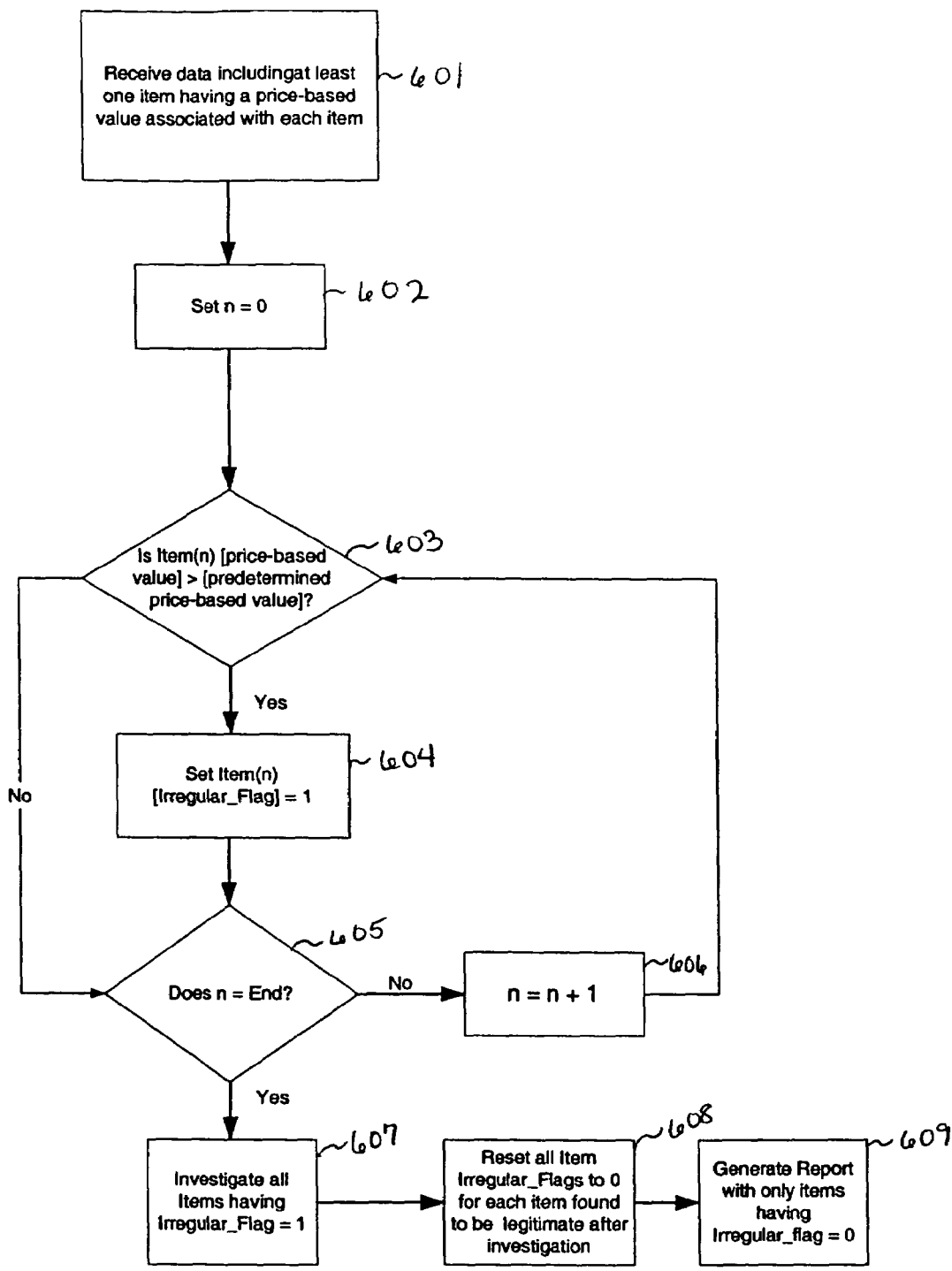
FIG. 6 is a flow diagram of a third embodiment of an irregular activity monitoring and automatic notification system.

FIG. 6 is a flow diagram of a third embodiment of an irregular activity monitoring and automatic notification system. At processing block 601, data is received including at least one item record having at least one price-based value associated with the item, as discussed above with respect to FIG. 4. At processing block 602, a counter n is set to 0.

At processing block 603, the price-based value of item(n) of a set of items is compared to a predetermined price-based value. If the price-based value of item(n) is not greater than the predetermined value, the irregular activity monitoring system 27 goes on to processing block 605.

If the price-base value of item(n) is greater than the predetermined value, at processing block 604, the value of an irregular_flag associated with item(n) is changed from 0 to 1. The system then proceeds to processing block 605 where the system checks to see if the end of the set of items has been reached. If the end of the set has not been reached, at processing block 606, the counter n is incremented by 1 and the system proceeds to processing block 603 to check the price-based value of the next item.

If the end of the set has been reached, the system proceeds to processing block 607 where each item having an irregular flag value of 1 is investigated. At processing block 608, the irregular flag values of all the transactions that are found to be legitimate are reset to 0. At processing block 609, a report or other data representation is generated where the data representation only includes items having an irregular flag value of 0.

Figure 7:
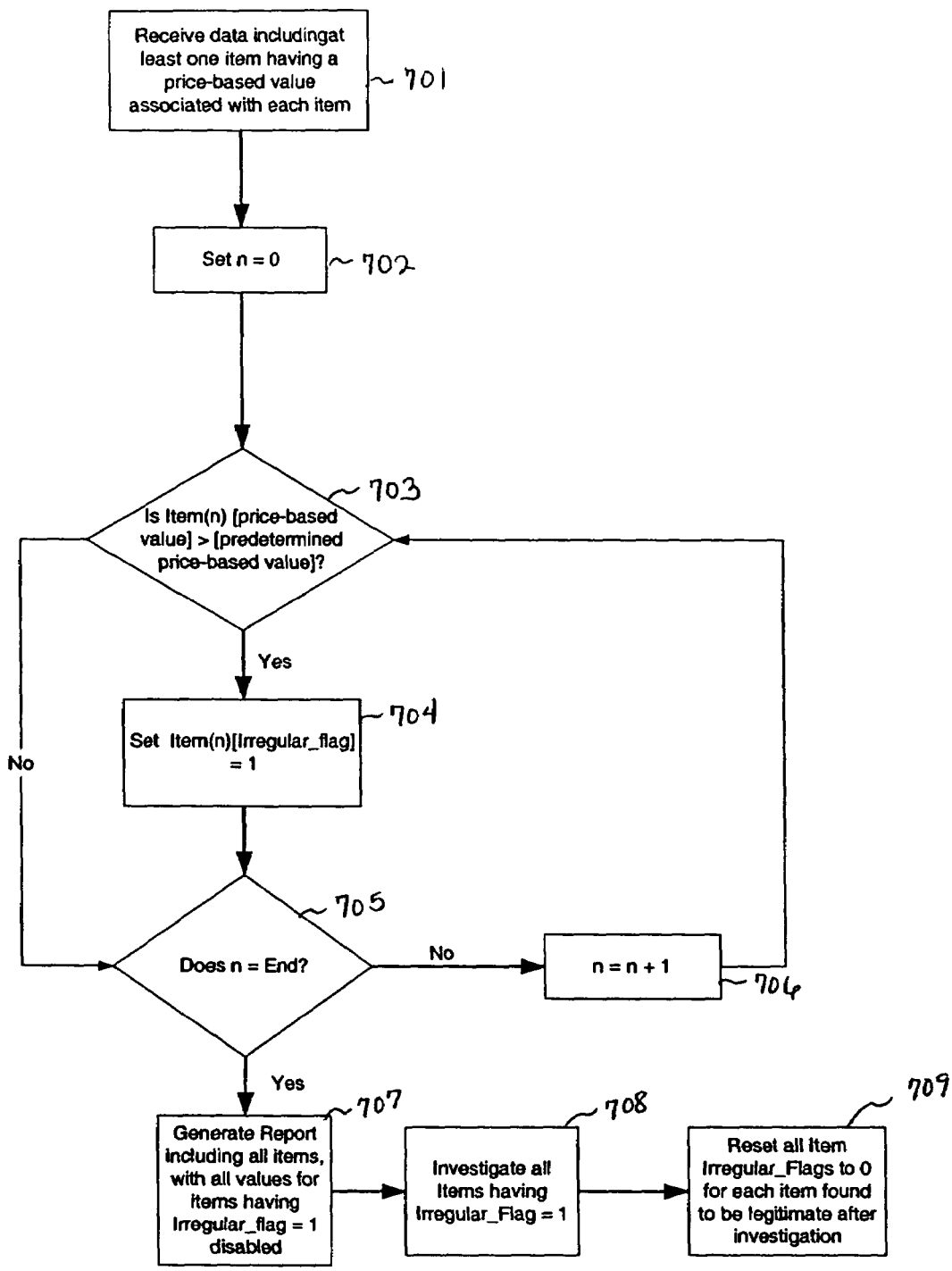
FIG. 7 is a flow diagram of a fourth embodiment of an irregular activity monitoring and automatic notification system.

FIG. 7 is a flow diagram of a fourth embodiment of an irregular activity monitoring and automatic notification system. At processing block 701, data is received including at least one item record having at least one price-based value associated with the item. At processing block 702, a counter n is set to 0.

At processing block 703, the price-based value of item(n) of a set of items is compared to a predetermined price-based value. If the price-based value of item(n) is not greater than the predetermined value, the irregular activity monitoring system 27 goes on to processing block 705.

If the price-base value of item(n) is greater than the predetermined value, at processing block 704, the value of an irregular_flag associated with item(n) is changed from 0 to 1. The system then proceeds to processing block 705 where the system checks to see if the end of the set of items has been reached. If the end of the set has not been reached, at processing block 706, the counter n is incremented by 1 and the system proceeds to processing block 703 to check the price-based value of the next item.

If the end of the set has been reached, the system proceeds to processing block 707 where a report or other data representation is generated where the data representation includes all items including items having an irregular flag value of 1. However, the records for all items having an irregular flag value of 1 are disabled so that the items are not used for any computations or statistics or other purposes, although the items appear in the data representations.

At processing block 708, all items having an irregular flag value of 1 are investigated. At processing block 709, the irregular flag values of all the transactions that are found to be legitimate are reset to 0 so that the item records may be included in computations and statistics.

Figure 8:
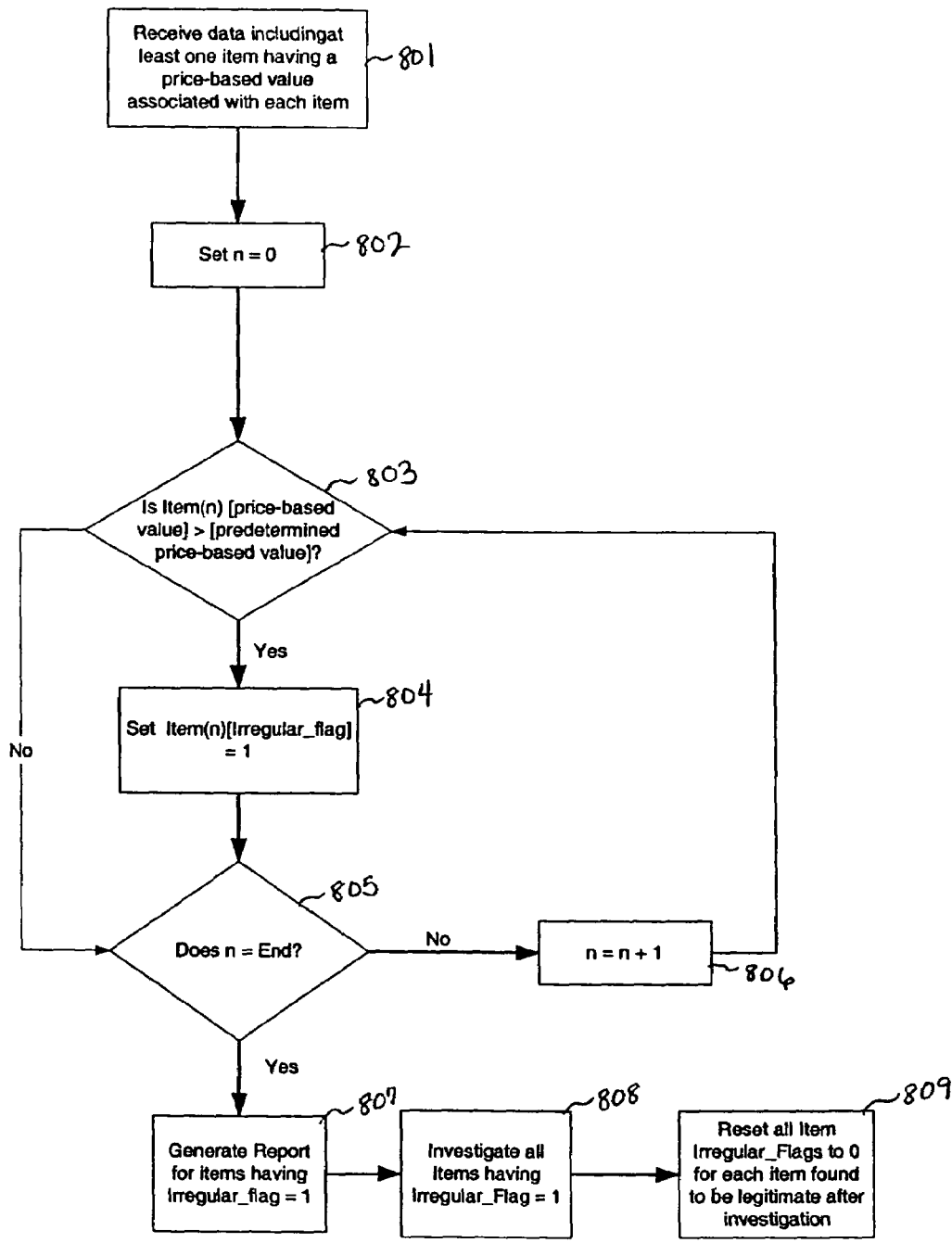
FIG. 8 is a flow diagram of a fifth embodiment of an irregular activity monitoring and automatic notification system.

FIG. 8 is a flow diagram of a fifth embodiment of an irregular activity monitoring and automatic notification system. At processing block 801, data is received including at least one item record having at least one price-based value associated with the item. At processing block 802, a counter n is set to 0.

At processing block 803, the price-based value of item(n) of a set of items is compared to a predetermined price-based value. If the price-based value of item(n) is not greater than the predetermined value, the irregular activity monitoring system 27 goes on to processing block 805.

If the price-base value of item(n) is greater than the predetermined value, at processing block 804, the value of an irregular_flag associated with item(n) is changed from 0 to 1. The system then proceeds to processing block 805 where the system checks to see if the end of the set of items has been reached. If the end of the set has not been reached, at processing block 806, the counter n is incremented by 1 and the system proceeds to processing block 803 to check the price-based value of the next item.

If the end of the set has been reached, the system proceeds to processing block 807 where a report or other data representation is generated where the data representation only includes items having an irregular flag value of 1. At processing block 808, all of the items in the report generated by processing block 807 are investigated. At processing block 809, the irregular flag values of all the transactions that are found to be legitimate are reset to 0 so that the item records are available for all computations, statistics, etc.

In summary, it will be appreciated that the above described interfaces, and underlying technologies, provide a convenient vehicle for the inputting of feedback, comments or opinions regarding multiple items, or transactions, via a single user interface.

Figure 9:
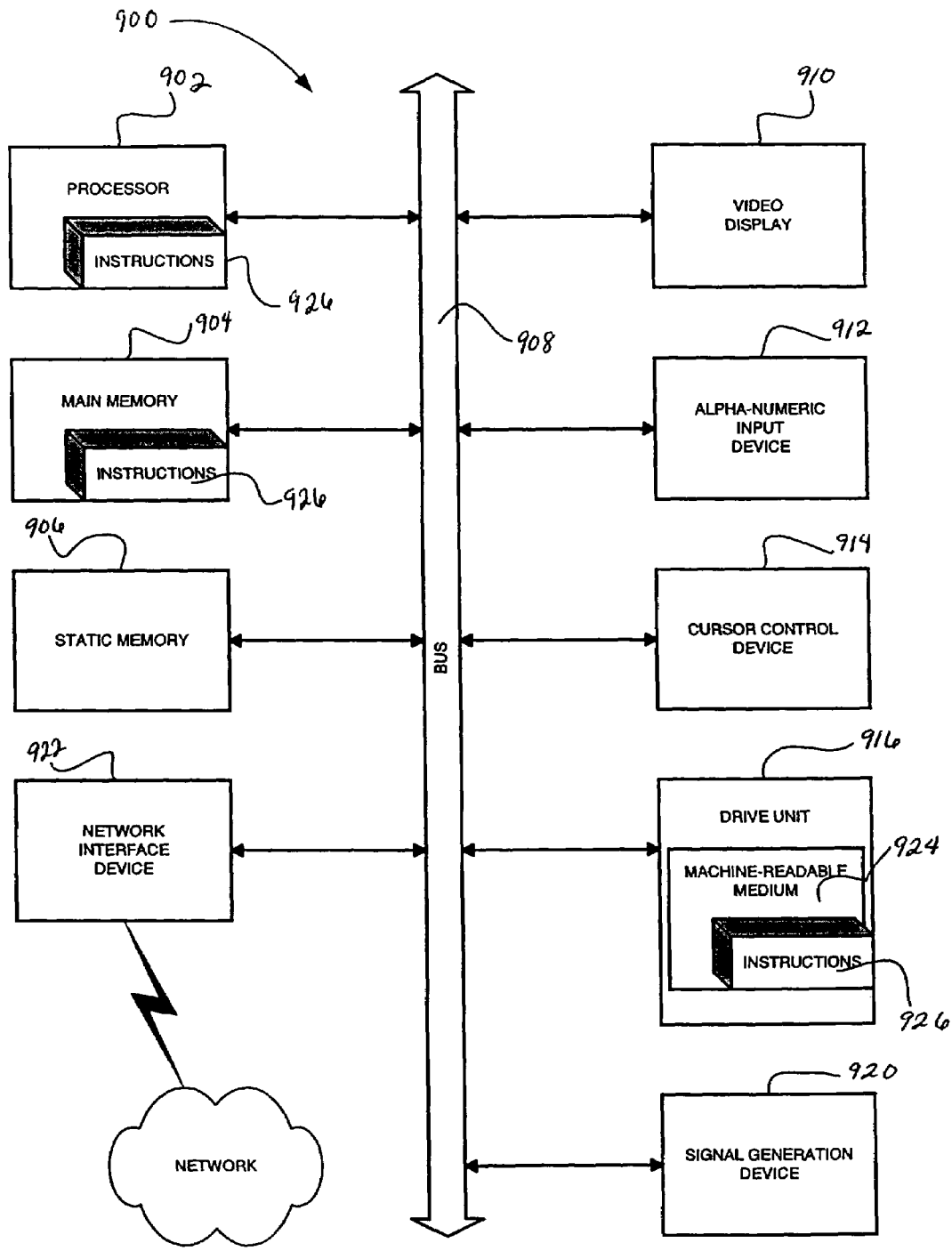
FIG. 9 is a block diagram of one embodiment of a computer system suitable for practicing the present invention.

FIG. 9 shows a diagrammatic representation of machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alpha-numeric input device 912 (e.g. a keyboard), a cursor control device 914 (e.g. a mouse), a disk drive unit 916, a signal generation device 920 (e.g. a speaker) and a network interface device 922

The disk drive unit 916 includes a machine-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 922. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and carrier wave signals.

Thus, a method and system for harvesting feedback information, comments, and opinions regarding multiple items from users of a network-based transaction facility have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented method including:
   receiving item data at a network-based transaction facility, the item data related to an item categorized in at least a first category of a plurality of categories of the network-based transaction facility and including an item price-based value associated with the item;
   automatically determining a category-specific threshold price-based value for the first category of the plurality of categories of the network-based transaction facility;
   automatically determining that the item data is irregular, based on the item price-based value associated with the item and the category-specific threshold price-based value for the first category of the plurality of categories of the network-based transaction facility; and
   responsive to the determination that the item data is irregular, automatically communicating an electronic message to an entity associated with the item.

2. The computer-implemented method of claim 1, wherein the automatic communication of the electronic message includes sending an email message to at least one of a seller and a buyer for the item, the e-mail message being automatically sent to an address associated with at least one of the buyer and the seller.

3. The computer-implemented method of claim 2, including unsetting the irregular item flag for the item data if the item data is subsequently found to be legitimate.

4. The computer-implemented method of claim 1, including, responsive to the determination that the item data is irregular, automatically setting an irregular item flag for the item data.

5. The computer-implemented method of claim 1, including converting the item price-based value associated with the item from a first currency to a second currency, wherein the second currency is a currency of the category-specific threshold price-based value.

6. The computer-implemented method of claim 1, wherein the item price-based value is a selling price of the item.

7. The computer-implemented method of claim 1, further including, responsive to the determination that the item data is irregular:
storing a user identifier for the entity associated with the item in an irregular user database; and
restricting the entity associated with the item from using the network-based transaction facility.

8. A machine-readable storage medium containing executable instructions which, when executed by a machine, cause the machine to perform the method of claim 1.

9. A system including:
means for receiving item data at a network-based transaction facility, the item data related to an item categorized in at least a first category of a plurality of categories of the network-based transaction facility and including an item price-based value associated with the item;
means for automatically determining a category-specific threshold price-based value for the first category of the plurality of categories of the network-based transaction facility;
means for automatically determining that the item data is irregular, based on the item price-based value associated with the item and the category-specific threshold price-based value for the first category of the plurality of categories of the network-based transaction facility; and
means, responsive to the determination that the item data is irregular, for automatically communicating an electronic message to an entity associated with the item.

10. A system including;
a database to receive and store item data, the item data related to an item categorized in at least a first category of a plurality of categories of a network-based transaction facility and including an item price-based value associated with the item;
a database engine server including an irregular activity monitoring system, wherein the irregular activity monitoring system is automatically to:
determine a category-specific threshold price-based value for the first category of the plurality of categories of the network-based transaction facility;
determine that the item data is irregular, based on the item price-based value associated with the item and the category-specific threshold price-based value for the first category of the plurality of categories of the network-based transaction facility; and
responsive to the determination that the item data is irregular, automatically communicate an electronic message to an entity associated with the item.

11. The system of claim 10, wherein the irregular activity monitoring system is automatically to send an email message to at least one of a seller and a buyer for the item, the e-mail message being automatically sent to an address associated the at least one of the buyer and the seller.

12. The system of claim 10, wherein the irregular activity monitoring system, responsive to the determination that the item data is irregular, is automatically to set an irregular item flag for the item data.

13. The system of claim 12, wherein the irregular activity monitoring system is to unset the irregular item flag for the item data if the item data is subsequently found to be legitimate.

14. The system of claim 10, wherein the irregular activity monitoring system is to convert the item price-based value associated with the item from a first currency to a second currency, wherein the second currency is a currency of the category-specific threshold price-based value.

15. The system of claim 10, wherein the item price-based value includes a selling price of the item.

16. The system of claim 10, wherein the irregular activity monitoring system, responsive to the determination that the item data is irregular, is to:
store a user identifier for the entity associated with the item in an irregular user database; and
restrict the entity associated with the item from using the network-based transaction facility.

\* \* \* \* \*

UNITED STATES PATENT AND TRADEMARK OFFICE
CERTIFICATE OF CORRECTION

PATENT NO.        : 7,493,281 B2
APPLICATION NO.   : 11/158651
DATED             : February 17, 2009
INVENTOR(S)       : Vogel et al.

It is certified that error appears in the above-identified patent and that said Letters Patent is hereby corrected as shown below:

On sheet 4 of 9, in Fig. 4 (Reference Numeral 401), line 1, delete "includingat" and insert -- including at --, therefor.

On sheet 5 of 9, in Fig. 5 (Reference Numeral 501), line 1, delete "includingat" and insert -- including at --, therefor.

On sheet 6 of 9, in Fig. 6 (Reference Numeral 601), line 1, delete "includingat" and insert -- including at --, therefor.

On sheet 7 of 9, in Fig. 7 (Reference Numeral 701), line 1, delete "includingat" and insert -- including at --, therefor.

On sheet 8 of 9, in Fig. 8 (Reference Numeral 801), line 1, delete "includingat" and insert -- including at --, therefor.

In column 8, line 7, after "922" insert -- . --.

In column 10, line 16, in Claim 11, delete "associated" and insert -- associated with --, therefor.

Signed and Sealed this

Twenty-first Day of April, 2009

JOHN DOLL
*Acting Director of the United States Patent and Trademark Office*